United States Patent [19]

Hänsgen et al.

[11] 3,824,879

[45] July 23, 1974

[54] ACTUATOR FOR MULTIPLE ACTION REMOTE CONTROL OF A SHIPS DRIVE SYSTEM

[75] Inventors: Klaus Hänsgen; Gerhard Ridder, both of Witten; Bernd Schuhmann, Dortmund, all of Germany

[73] Assignee: Mannesmann-Meer Aktiengesellschaft, Monchengladbach, Germany

[22] Filed: Apr. 16, 1973

[21] Appl. No.: 351,643

[30] Foreign Application Priority Data
Apr. 18, 1972  Germany............................ 2219486

[52] U.S. Cl. .............................................. 74/878
[51] Int. Cl............................................ B60k 23/00
[58] Field of Search............. 115/34 R; 74/875, 876, 74/877, 878

[56] References Cited
UNITED STATES PATENTS
2,729,984  1/1956  Morse................................. 74/875
3,043,154  7/1962  Morse................................... 74/875
3,147,636  9/1964  Manzolillo............................ 74/876
3,511,117  5/1970  Morse.................................. 74/878

Primary Examiner—Robert J. Spar
Assistant Examiner—G. L. Auton
Attorney, Agent, or Firm—Ralf H. Siegemund

[57] ABSTRACT

An actuator for speed and directional control of a ships drive and gearing system wherein a single handle-lever turns a control shaft with a control disk coupled to a follower disk and when in one axial position only, for the directional control of the gear, while in either axial position the control disk is coupled to the speed control but only after a limited turning range has been traversed by the handle, which turning range is the one within which the direction control is carried out. The control disk and the follower control disk are coupled for limited range engagement by a single cam pin on the control disk means and a pair of teeth engaging that pin until rotation causes the latter to escape.

5 Claims, 7 Drawing Figures

ACTUATOR FOR MULTIPLE ACTION REMOTE CONTROL OF A SHIPS DRIVE SYSTEM

BACKGROUND OF THE INVENTION

The present invention relates to the remote control of a ships drive and propulsion system.

Remote control genrally and for such systems in particular, is usually carried out by means of a manually operable handle. The handle is constructed as a control lever coupled to a control shaft which is journalled in a horizontal position for pivot motion in both directions, but over a limited range. A control disk is mounted on the shaft, turning therewith, and being coupled to a gear which is mounted on a second shaft. The second shaft, in turn, is journalled below the first one and extends parallel thereto. This second, intermediate shaft is flanked on both sides by mechanical transmission means which are respectively operably connected to the forward and reverse switches of the main reversing gear of the ships drive. Additionally, the (first) control shaft when burning beyond the range for switching action on the reversing gear operate a speed governor, such as a command value transducer of the ships drive engine. Furthermore, the connection to the speed control can be maintained while the connection to the gear is disconnectible.

The control device of the type described has multipurpose function. First of all, it enables the reversing gear for causing the ship to move forward or reverse. Next, the speed of the engine is to be adjusted, regardless of the direction of ships movement. The drive engine should be permitted to run up for warm-up without connection to the transmission gear. The manual actuating and control device as outlined above, fulfills all these functions, but the known structure lacks reliability and simplicity.

SUMMARY OF THE INVENTION

It is an object of the present invention to improve the construction of such manual control actuator, bearing in mind that the multiple functions must not lead to unsound and mechanically complicated constructions, whereby not too much space is to be occupied by the device, but reliability must not suffer.

It is another object of the present invention to permit acceleration of the ships drive engine by operation of the control shaft mentioned above without incurring the possibility of shifting the transmission out of gear accidentally. Conversely, when the engine runs up, the reversing gear is not to be turned on accidentally.

In accordance with the preferred embodiment of the present invention, the following combination is suggested. The principle manipulated element is a handle actuator and lever coupled to a control shaft for turning same as well as for providing limited axial displacment between two limit positions. A control disk means is connected to the control shaft. The control disk means has two functions and is constructed accordingly.

For purposes of providing forward and reverse gear control, a follower control disk means is journalled parallel to the control shaft; the control disk means includes a cam pin and an annulus with a gap, the follower control disk includes a pair of teeth receiving the cam pin for a limited range of turning motion of the control disk means, forcing the follower control disk means to follow until the cam pin escapes. This coupling relation can exist only in one of the axial positions of the control shaft, not in the other. The teeth of the follower disk means have outer contour at the respective sides facing away from the pin-receiving recess in-between, which contours serve as turning bed for the annulus and as sliding stop for the follower disk means upon continued rotation of the control shaft and disk, after the cam pin has escaped from between the teeth.

The second function of the control disk means is provided independent from the axial disposition, but as the disk means assumes the one axial disposition, the second function must be effective only after the cam pin has escaped from between the teeth. A transmission member with a horizontal cam follower bar is disposed for up and down movement. The control disk means has cam members engaging the bar for lifting the transmission member regardless of the direction of turning of the control disk means. The transmission member provides for speed control upon turning of the handle in either direction.

The construction, therefor, can be seen in a combination in which the control disk means can be coupled by a single tooth and pin cam to a pair of teeth on the follower control disk so that the former turns the latter until the cam pin escapes. On the other side of the control disk means, cam members will engage the transmission member for the speed control only after the control disk means has turned beyond the range of possible engagement with the follower control disk means, such engagement depending on the axial disposition of the control shaft as manipulated by the handle. This way then, the handle can be used always for speed control of the engine, with or without prior turning on and engagement of forward and reverse gearing.

Additional features call for symmetric projection of the teeth into the gap of the annulus with deepest position of the cam pin in the recess in-between the teeth when the handle and control shaft have neutral position. The control disk has the annulus with cam pin situated on one side, the cam members are on the other side of that disk. The follower disk sits on a shaft parallel to the control shaft underneath thereof, and the transmission member has a guide slot traversed by both shafts. The two axial positions of the control shaft with control disk are apart by a distance about equal to the axial length of the pin cam or the axial thickness of the teeth, whatever is larger, and depending on the axial penetration depths of pin cam and teeth when in engaging position.

Still further features of the invention reside in the provision of another disk as part of the control disk means which engages two symmetrically disposed stop means on and being part of the follower control means to inhibit rotation thereof when the control shaft and control disk are in the other position wherein the cam pin is axially disengaged from the teeth, so that the speed control can be actuated without turning-on either direction of the reversing gear.

The gap of the annulus may be biparted and contoured to receive the peaks of the teeth during rotation, while the pin cam has contour matching the recess between the teeth during engagement while both, control disk means and follower control disk means, rotate due to the engagement.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, the Figures illustrate a manual actuator and control device which includes a handle 25 for manual operation. The handle is provided with a control shaft 1 which is directly turned upon manipulating handle 25. Shaft 1 is journalled in a horizontal disposition in a casing 34, and handle 25 pivots in a vertical plane upon actuation. The control shaft 1 is permitted to undergo limited axial displacement in its bearings.

A control disk 2 is mounted on shaft 1 and moves therewith axially as well as rotationally in both directions relative to the neutral (vertical) position of handle 25. Disk 2 is geared to a follower control disk 4 which can turn on an intermediate shaft 19. A sprocket wheel 23 is connected to disk 4 and a chain 24 runs over and engages the sprocket wheel so that stringers of the chain run down to both sides of shaft 19. The two stringers of the chain lead to the forward and reversing switches of the ships reversing gear. It can, thus, be seen that the two chain stringers as leading to the reversing gear extend down and symmetrically to the axis of follower control disk 4.

Figure 3:
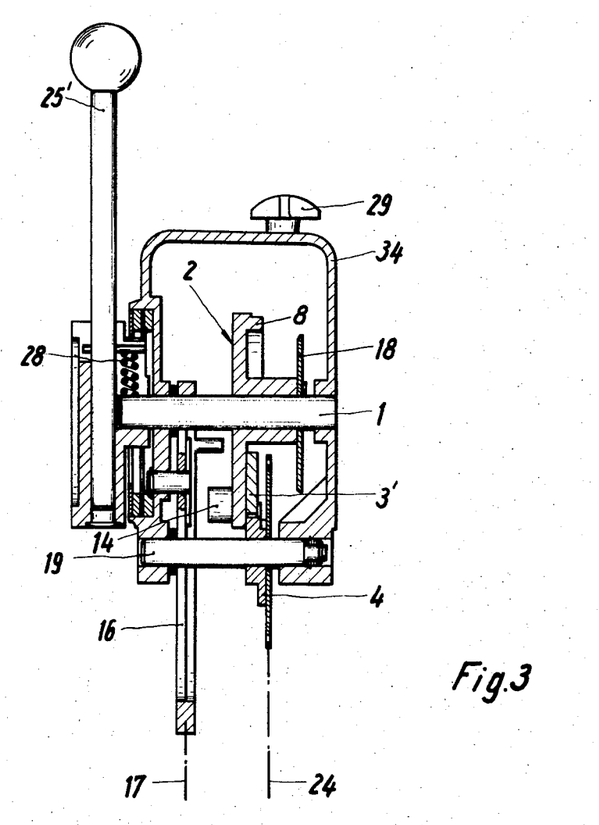
FIG. 3 is a section view, similar to FIG. 2 but of a somewhat modified actuation.
Figure 5:
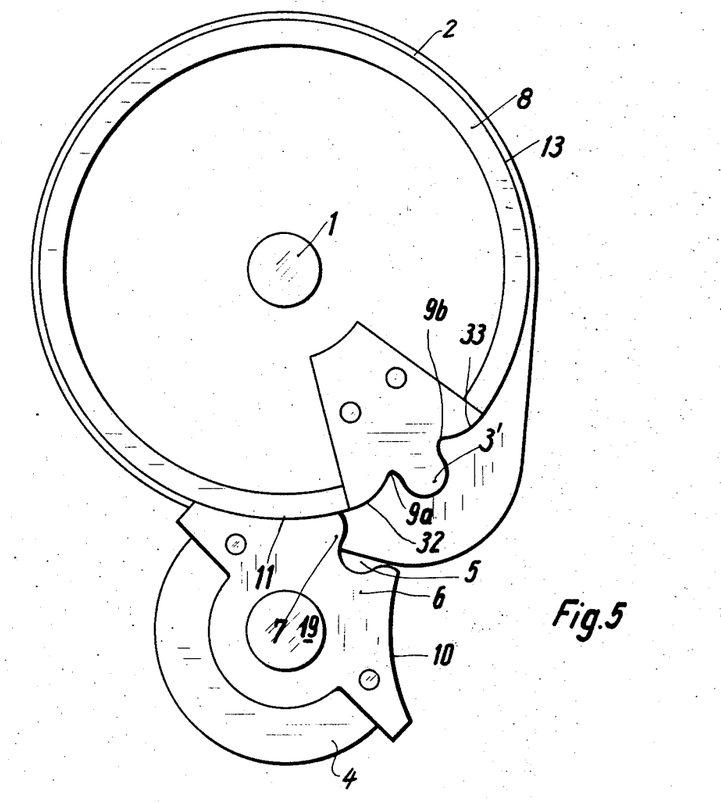
FIG. 5 illustrates somewhat schematically a detail of FIG. 3.

Another chain 17 or the like, is provided as transmission to the speed command transducers of a ships engine. A transmission member 16, to which chain 17 is linked, is particularly connectible to the control disk 2 so that the chain 17 is actuated when the handle turns the control shaft beyond the range needed for turning on the reversing gear in either direction. Details will be described more fully below. The elements as described generally thus far are subject to the improvements to be described next. The control disk 2 is coupled to follower control disk 4 by means of a pin 3 on disk 2, serving as a cam. When the control shaft 1 has neutral position, pin 3 rests in the recess or gap 5 between the two only teeth 6 and 7 of gearing 4. The teeth 6 and 7 are of asymmetric configuration. The apeces or tips of the teeth reach into a gap 9 in an annulus 8 which is mounted on the control disk 2. (The modification of FIGS. 3 and 5 shows two gaps 9a, 9b, for the same purpose, one for each tooth).

Figure 4:
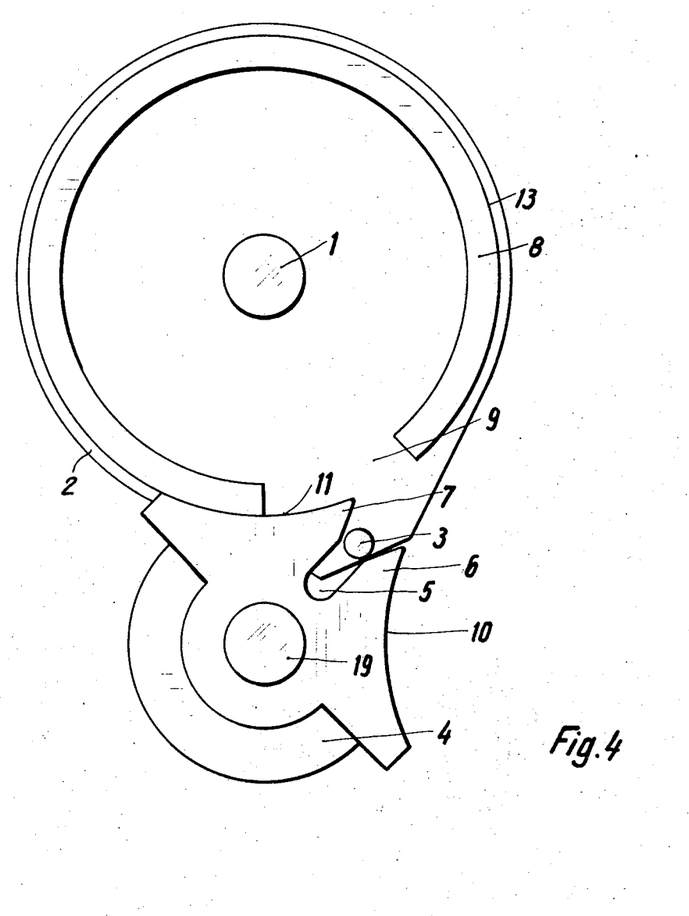
FIG. 4 illustrates somewhat schematically a detail of FIGS. 1 and 2.

The outer flanks 10 and 11 respectively of the teeth 6 and 7 are concavely curved and serve as running and sliding surfaces for the annulus 8 when disk 4 does not follow the rotation of disk 2. The curvature of flanks 10 and 11 is the same as the curvature of the periphery 13 of annulus 8. FIG. 4 illustrates a first operating position wherein the flank 11 has just been placed into abutment with periphery 13. The pin has just about escaped from recess 5.

It can, thus, be seen that in a disposition of the follower disk 4, as shown in FIG. 4 (or in a mirror image disposition as of FIG. 4), the concave flank 11 (or flank 10), serves as a bed for further clockwise (or counterclockwise) rotation of annulus 8, engaging the respective outer tooth flank along its periphery. Conversely, that engagement operates as a stop for further rotation disk 4!. The disk 4 is, thus, locked in an angularly deflected position commensurate with a displacement path for one or the other stringer of chain 24 for engaging the transmission gear of the ship. That position is positively maintained until disk 2 and annulus 8 returns counterclockwise in FIG. 4 and pin 3 enters slot 5, while the teeth can enter the gap 9. Only then will disk 4 be permitted to rotate again, back to the neutral position for turning off the transmission gear.

Figure 1:
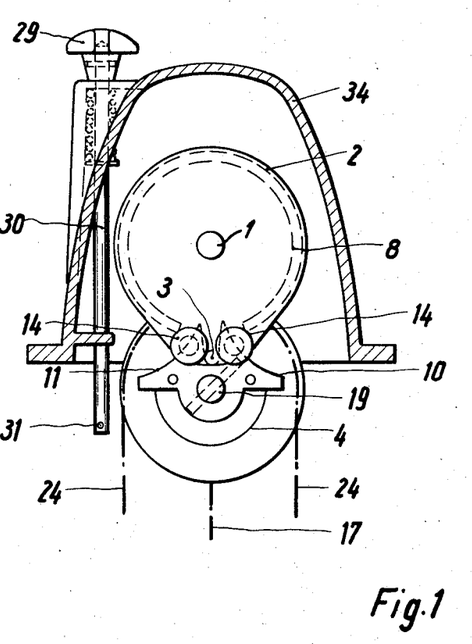
FIG. 1 is a cross section through the control actuator in accordance with the preferred embodiment of the invention, the section being taken transverse to the control and intermediate shafts of the actuator.

As stated, both teeth reach into the gap 9 in the neutral position of shaft 1 and of handle 25, and the centers of gap 9, shaft 1, pin 3, gap 5, all are aligned on a vertical (see FIG. 1) for this neutral position. On the other side of disk 2 (other in relation to the disposition of annulus 8), there is provided a pair of cam members 14 (see FIGS. 1 and 2). The members 14 are constructed as two rollers, respectively journalled on pins.

Figure 7:
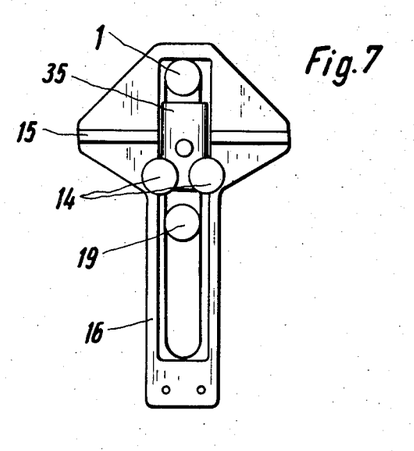

In the position of disk 2, as shown in FIG. 4, one of the rollers 14 will abut a cam bar 15 on the transmission member 16. Member 16 is shown in greater detail in FIG. 7 and is constructed as a so-called Maltese-cross-like geneva wheel. The member 16 has a guide slot traversed by the control shaft 1 and by the intermediate shaft 19, but with clearance so that rotation of these shafts is not impeded. A holder 35 is secured to the housing or casing 34 (and is, thus, stationary) and fixes the axial position of member 16 in relation to the shafts 1 and 19 as located in and traversing the slot of member 16. For facilitating orientation, cam members 14 of disk 2 have been included in FIG. 7 in superimposed illustration; they are not secured to member 16.

Cam members 14 move up and along a circular path during rotation of control disk 2 so that in dependence upon the direction of actuation of shaft 1 either the left-hand roller 14 or the right-hand roller 14 is brought into abutment with cam bar 15, and lifts member 16 accordingly. It can be seen particularly that in the neutral position of elements 25–1–2, rollers 14 are below bar 15. It takes a particular degree (angle) of rotation of disk 2 in either direction before one of the rollers abuts the cam bar from below. This will occur only after pin 3 has disenganged from follower disk 4!

The pulling chain 17 was already mentioned above. Specifically, the chain 17 connects with the illustrated end to transmission member 16. The other end of chain 17 connects to the adjustment element in the command signal transducer or the like, for the control circuit in the engine. When chain 17 is pulled, the engine speed will increase.

The engine is started by a starter button 29, which is pulled for pulling a rod 30 in up direction. The starter proper connects to point 31 on the rod 30. These features are mentioned here only to demonstrate that the starter can readily be combined structurally with the casing 34 of the actuator arrangement as described.

The connection between disks 2 and 4 was primarily described with reference to FIGS. 2 and 4. FIGS. 3 and 5 show a modification. FIG. 4 has a pin 3 for engagement with the gap 5 between teeth 6 and 7; FIG. 5 shows a tooth 3' matching the contour of the somewhat shallower gap 5' in this instance. FIG. 5 shows furthermore that concave guide surfaces 32 and 33 extend from respectively the flanks of the tooth 3' which then merge with the outer periphery 13 of annulus 8.

The function of the gap in annulus 8 is the same in either case. It permits entry of the points of the teeth on follower disk 4, while particularly the portions of annulus 8 adjacent the gap serve as stop for the disk 4 after disengagement of cam pin 3 (or 3'). The particular example of FIGS. 3 and 5 provide some more guidance for the teeth peak when entering and moving out of the gap area of the annulus 8.

Figure 2:
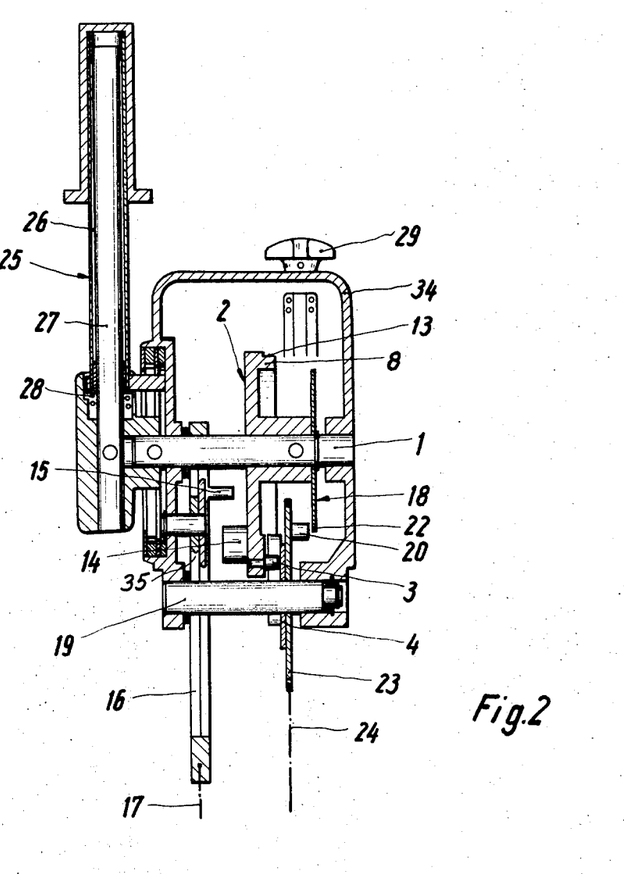
FIG. 2 is a section view, taken in the plane of the axes of control and intermediate shafts.
Figure 6:
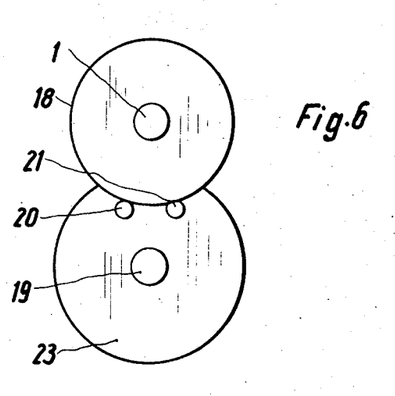
FIGS. 6 and 7 show additional details from FIG. 2.

FIG. 2 (and 6) shows additionally an annular disk 18 secured to shaft 1 and FIG. 6 shows the particular disposition of elements 1, 18 and 23 when the control shaft 1 is adjusted to neutral position. In that position elements 1 and 18 are axially displaceable over a length corresponding to the width of pin 3 (or tooth 3') and/or corresponding to the thickness of disk 4. The elements 1, 2 and 18 (in unison) may assume two (aixal) limit positions. Cam pin 3 is axially displaced from gap 5 in just one of these end positions, and disks 2 and 4 are completely decoupled in that axial disposition of the control elements 1, 2 and 18. On the other hand, in this one axial disposition of elements 1-2-18, disk 18 abuts two pins 20, 21, at its periphery (see FIG. 6), but only as long as cam pin 3 is axially decoupled from gap 5.

The pins 20 and 21 are indirectly connected to shaft 19 and have similar distance to the axis thereof. Pins 20, 21 (not shown in FIG. 3) are actually mounted to the backside of gear or sprocket wheel 23, which is secured to shaft 19 and overlaps partially disk 18.

Accordingly, disk 18 when engaging pins 20 and 21, inhibits any rotation of follower disk 4 when the assembly 1-2-18 is in the axial position wherein pin 3 is axially disengaged from gap 5 and from the teeth 6/7 of disk 4. Thus, stops 20 and 21 lock disk 4 when transmission gear operation is not desired, but speed control of the engine is. Pins 20 and 21 do not function as stops when pin 3 engages teeth 6 and 7. The azimuthal disengagement of the latter elements presents a different situation when disk 2 has turned over a certain angle (FIG. 4).

As stated above, chain 24 engages gear 23 and is actuated upon rotation of gear 23. As stated further, the front gear 23 connects to disk 4 for common rotation.

The handle 25 of the actuator is shown in a somewhat simple form in FIG. 3, and as such has no immediate relation to the other differences between the arrangments of FIGS. 2 and 3. The specific handle 25 of FIG. 2 is provided with a sleeve 26, which is slidably disposed on a lever 27. The lower end of sleeve 26 has teeth which engage position arresting openings 28 (catch) of a part that can be considered a part of the casing 34 and is stationary on that account. As sleeve 26 is pressed down, the catch is released and the handle 25 can be manipulated for turning the control shaft 1, the rotational manipulation being carried out in a vertical plane transverse to the plane of the drawing of FIG. 2.

The actuators as described in the several Figures operate as follows: The user grips the handle and pulls the shaft 1 axially to the left in FIG. 2, so that the disk 18 abuts pins 21 and 22 (FIG. 6), thereby locking follower disk 4 against rotation. Concurrently, cam pin 3 disengages from the teeth 6 and 7 and that permits turning of control shaft 1, without any rotation being imparted upon follower disk 4. Thus, none of the gears is engaged in the ships drive! Next, the user pulls starter button 29 and the engine should start. Turning the handle so as to rotate shaft 1 in either direction will cause the disk 2 to rotate and soon one of the rolls 14 will abut cam bar 15 and further rotation of elements 1-2-14 will lift element 16 so as to pull on string or chain 17. This way, engine speed can be adjusted, while still operating under no-load condition. As soon as the engine runs regularly, it can run up for warm-up in any desired speed adjusted by means of the handle — control shaft — control disk position.

If the vessel is now to be set into motion, the handle 25 (25') is returned to the neutral, e.g. upright, position, and is shifted axially to the right (FIG. 2). Accordingly, disk 18 disengages from stops 20, 21, but the cam pin 3 enters recess 5 between teeth 6 and 7. As the handle 25 is now pivoted, that pivot motion is directly transmitted via disks 4, 23, upon the chain 24, and the transmission gear of the ships drive is turned on and engages either for forward or for reverse motion of the vessel, depending on the direction of lever handle actuation. Only a particular stroke length for either of the stringers of chain 24 is needed for that purpose, and soon the pin 3 disengages from the recess 5 between the teeth, so that further rotation of disk 2 is not transmitted upon the disk 4 and chain 24. On the other hand, one or the other of the flanks 10-11 of follower disk 4 engages the annulus 8 so that the angular disposition of the disk 4 is maintained. Accordingly, the gear will not disengage upon further turning of shaft 1, even though the turning control disk 2 is decoupled from disk 4 as far as transmission of rotation is concerned.

As pin 3 escapes from recess 5 between teeth 6 and 7, one of the cam members 14 engages the transverse cam 15 of member 16 and lifts the same upon further turning of control shaft 1. This lifting occurs regardless of the direction of turning of shaft 1. Upon lifting member 16, chain 17 is pulled up, and the speed command transducer is adjusted for increasing the engine speed.

The invention is not limited to the embodiments described above but all changes and modifications thereof not constituting departures from the spirit and scope of the invention are intended to be included.

We claim:

1. An actuator mechanism for single lever actuation of directional (forward and reverse) control and speed control in mutual independency for purpose of control of a ship's drive, comprising:

a handle lever;

an axially displaceable control shaft connected to the handle lever for turning therewith, the handle lever also providing for axial displacement of the control shaft between a first and second position;

control disk means on the control shaft and being axially displaceable therewith, the control disk means including a cam pin;

follower control disk means journalled for rotation on an axis parallel to the control shaft, the follower control disk having a pair of stops, further being provided with a pair of teeth, there being a recess between the teeth receiving the said cam pin when the control shaft is in the first axial position, the cam pin when received in the recess between the teeth of the pair turning the follower control disk until escaping from the recess between the teeth, the cam pin axially displaced from the teeth in any position when the control shaft is in the second position;

the control disk means including a disk axially displaceable therewith and engaging the stops in the second position for inhibiting rotation of the follower control disk means.

means for providing sliding contact between the control disk means and the follower disk means for inhibiting further rotation of the follower disk means after the cam pin has escaped from the recess between the teeth;

a transmission member disposed for up and down movement and having a horizontally transverse cam follower bar;

a pair of cams on the control disk means eccentric to the axis of the control shaft and being a part of the control disk means;

the transmission member disposed, so that one or the other of the cams of the pair engages the cam follower bar and lifts the transmission member after the said cam pin has escaped from between the teeth of the follower control disk means, the cams of the pair engaging the bar in either one of said first and second axial positions of the control shaft and of the control disk means;

the follower control disk means being coupled to the directional control for actuation thereof for forward or reverse motion of the ship, depending on the direction of rotation as imparted upon the follower control disk means when turned by the control disk means during engagement of the cam pin by the said teeth; and the transmission member being coupled to the speed control for operation thereof.

2. Actuator as in claim 1, the follower control disk means including a sprocket wheel carrying the stops, the sprocket wheel driving a chain, the chain provided for coupling the follower control disk means to the directional control.

3. The actuator as in claim 1, the means for providing sliding contact including an annulus with a gap adjacent the pin as part of the said control disk means, concentric to the control shaft; and the teeth having outer, concavely curved flanks, one or the other forming a bed in which the annulus turns slidingly upon rotation of the control shaft after the cam pin has escaped from the recess between the teeth.

4. Actuator as in claim 3, the gap in the annulus being biparted, the cam pin constructed with tooth contour for matching the contour of a gap between the said teeth, the cam pin flanked by contours merging with the peripheral contour of the annulus and outlining the motion of the peaks of the teeth upon turning of the control disk.

5. Actuator as in claim 1, the follower control disk means including a first disk having said pair of teeth, and and a second disk positively connected thereto for coaxial rotation and constructed as sprocket wheel driving a chain, the chain provided for coupling the follower control disk means to the directional control.

* * * * *